US012625511B2

(12) United States Patent
Kaur et al.

(10) Patent No.: US 12,625,511 B2
(45) Date of Patent: May 12, 2026

(54) IN SITU STRAIN COMPENSATION AFE

(71) Applicant: TEXAS INSTRUMENTS INCORPORATED, Dallas, TX (US)

(72) Inventors: Divya Kaur, Bangalore (IN); Vinod Menezes, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/394,458

(22) Filed: Dec. 22, 2023

(65) Prior Publication Data

US 2025/0028343 A1 Jan. 23, 2025

(30) Foreign Application Priority Data

Jul. 20, 2023 (IN) ............................. 202341048797

(51) Int. Cl.
*G05F 1/565* (2006.01)

(52) U.S. Cl.
CPC .................................... *G05F 1/565* (2013.01)

(58) Field of Classification Search
None
See application file for complete search history.

(56) References Cited

U.S. PATENT DOCUMENTS 10,955,868 B2 * 3/2021 Brule ........................ G05F 3/30
11,480,989 B2 * 10/2022 Liu ........................... G05F 3/18

* cited by examiner

*Primary Examiner* — Jeffrey S Zweizig
(74) *Attorney, Agent, or Firm* — Frank D. Cimino

(57) ABSTRACT

A circuit (70) includes a voltage reference circuit (72) that includes an output terminal (74), wherein the voltage reference circuit (72) is configured to generate an output voltage at the output terminal (74) having a first transfer function of voltage with respect to strain. The circuit (70) also includes a strain compensation circuit (78) having an input terminal connected to the output terminal (74) of the voltage reference circuit, and having a strain compensation circuit output terminal (80). The strain compensation circuit (78) is configured to receive the output voltage comprising the first transfer function at the input terminal. The strain compensation circuit (78) has a second transfer function of voltage with respect to strain that is substantially opposite that of the first transfer function, thereby outputting a compensated voltage at the strain compensation circuit output terminal (80) that is substantially independent of strain.

21 Claims, 9 Drawing Sheets

IN SITU STRAIN COMPENSATION AFE

REFERENCE TO RELATED APPLICATION

This Application claims the benefit of Indian Patent Application No. 202341048797, filed on Jul. 20, 2023, the contents of which are hereby incorporated by reference in their entirety.

BACKGROUND

Many modern devices include various electrical circuits. One type of circuit is a voltage reference circuit. It is desired to make a voltage reference circuit that is precise and to maintain such precision over time and independent of stress, temperature, or both.

SUMMARY

In one example, a circuit comprises a voltage reference circuit comprising an output terminal. The voltage reference circuit is configured to generate an output voltage at the output terminal, and the output voltage comprises a first transfer function of voltage with respect to strain. The circuit also comprises a strain compensation circuit having an input terminal connected to the output terminal of the voltage reference circuit, and having a strain compensation circuit output terminal. The strain compensation circuit is configured to receive the output voltage comprising the first transfer function at the input terminal. The strain compensation circuit comprises a second transfer function of voltage with respect to strain that is substantially opposite that of the first transfer function, thereby outputting a compensated voltage at the strain compensation circuit output terminal that is substantially independent of strain.

In one aspect of the disclosure the strain compensation circuit comprises a strain dependent circuit element that exhibits an impedance that is a function of strain. Further, in one aspect of the disclosure the strain dependent circuit element comprises a piezoelectric resistor.

The circuit, in another aspect of the disclosure, further comprises a variable current source circuit connected to the strain compensation circuit output terminal. The variable current source circuit is configured to source or sink a strain compensation current to or from, respectively, the strain compensation circuit. The strain compensation current results in a strain compensation voltage that the strain compensation circuit adds or subtracts, respectively, to the output voltage at the output terminal of the voltage reference circuit to form the compensated voltage at the strain compensation circuit output terminal.

In another aspect of the disclosure, the circuit also comprises a baseline compensation current generation circuit configured to generate a baseline compensation current. The variable current source circuit is coupled to the baseline compensation current generation circuit, and is further configured to generate the strain compensation current based on the baseline compensation current.

In one aspect of the disclosure the variable current source circuit comprises a plurality of parallel-connected, selectively activated transistor circuits coupled in a current mirror configuration with the baseline compensation circuit generation circuit. The variable current source circuit also comprises a control circuit configured to generate and couple a plurality of control signals to the parallel-connected, selectively activated transistor circuits, respectively, thereby causing one or more of the parallel-connected, selectively activated transistor circuits to conduct to form the strain compensation current.

In one aspect of the disclosure, each parallel-connected, selectively activated transistor circuit comprises a transistor connected in series with a switch element that is configured to receive a respective one of the plurality of control signals at a control terminal thereof. When a state of the respective control signal closes the switch element, the respective parallel-connected, selectively activated transistor circuit is activated and conducts a current therethrough having a magnitude corresponding to a sizing of the respective transistor.

In one aspect of the disclosure the circuit further comprises a temperature compensation circuit having an input terminal connected to the strain compensation circuit output terminal. The temperature compensation circuit is configured to sense a temperature at the circuit and generate a temperature compensation voltage based on the sensed temperature. The temperature compensation circuit is further configured to combine the temperature compensation voltage with the compensated voltage at the output terminal of the strain compensation circuit to form a combined strain and temperature compensated voltage at an output terminal of the temperature compensation circuit.

In one aspect of the disclosure a circuit is disclosure that comprises a current source circuit configured to generate a source current at a current source output terminal. The source current has a first, bias current component, and a second, compensation current component. The circuit also comprises a voltage reference circuit configured to generate a reference voltage at a voltage reference output terminal. The voltage reference output terminal is coupled to the current source output terminal, and the voltage reference circuit is configured to sink the first, bias current component of the source circuit. The circuit also comprises a strain compensation circuit having an input terminal connected to the output terminal of the voltage reference circuit, and having a strain compensation circuit output terminal. The strain compensation circuit is configured to source or sink the second, compensation current component, generate a strain compensation voltage based on the second, compensation current component, and combine the reference voltage and the strain compensation voltage to form a compensated reference voltage at an output terminal of the strain compensation circuit.

In one aspect of the disclosure the strain compensation circuit comprises a strain dependent circuit element that exhibits an impedance that is a function of strain. In one aspect, the strain dependent circuit element comprises a piezoelectric resistor.

In another aspect of the disclosure, the circuit further comprises a variable current source circuit connected to the strain compensation circuit output terminal. The variable current source circuit is configured to source or sink the second, compensation current component to or from, respectively, the strain compensation circuit. The second, compensation current component results in a strain compensation voltage that the strain compensation circuit adds or subtracts, respectively, to the reference voltage at the output terminal of the voltage reference circuit to form the compensated reference voltage at the strain compensation circuit output terminal.

In one aspect of the disclosure, the current source circuit is configured to generate a base compensation current, and the variable current source circuit is configured to source or sink the second, compensation current component based on the baseline compensation current. In one aspect the variable current source circuit comprises a plurality of parallel-connected, selectively activated transistor circuits coupled in a current mirror configuration with circuitry in the current source circuit that generates the baseline compensation current, and a control circuit. The control circuit is configured to generate and couple a plurality of control signals to the parallel-connected, selectively activated transistor circuits, respectively, thereby causing one or more of the parallel-connected, selectively activated transistor circuits to conduct to form the second, compensation current component.

In one aspect of the disclosure each parallel-connected, selectively activated transistor circuit comprises a transistor connected in series with a switch circuit element that is configured to receive a respective one of the plurality of control signals at a control terminal thereof. When a state of the respective control signal closes the switch circuit element, the respective parallel-connected, selectively activated transistor circuit is activated and conducts a current therethrough having a magnitude corresponding to a sizing of the respective transistor.

In one aspect of the disclosure the circuit further comprises a temperature compensation circuit having an input terminal connected to the strain compensation circuit output terminal. The temperature compensation circuit is configured to sense a temperature at the circuit and generate a temperature compensation voltage based on the sensed temperature, and combine the temperature compensation voltage with the compensated voltage at the output terminal of the strain compensation circuit to form a combined strain and temperature compensated voltage at an output terminal of the temperature compensation circuit.

In one aspect of the disclosure a method is disclosed. The method comprises generating a reference voltage using a voltage reference circuit. The generated reference voltage is provided at an output terminal of the voltage reference circuit, and comprises a first transfer function of voltage with respect to strain. The method also comprises generating a strain compensation voltage using a strain compensation circuit that has an input terminal connected to the output terminal of the voltage reference circuit. The strain compensation voltage comprises a second transfer function of voltage with respect to strain that is substantially opposite that of the first transfer function. The method also comprises combining the reference voltage with the strain compensation voltage to form a compensated reference voltage, and outputting the compensating reference voltage at an output terminal of the strain compensation circuit.

In one aspect of the method, the strain compensation circuit comprises a strain dependent circuit element that exhibits an impedance that is a function of strain. Further, in one aspect the method comprises sourcing or sinking a strain compensation current to or from, respectively, the strain compensation circuit using a variable current source circuit, wherein the strain compensation current results in the strain compensation voltage. The method also comprises generating a baseline compensation current using a baseline compensation current generation circuit configured, and generating the strain compensation current based on the baseline compensation current by coupling the variable current source circuit to the baseline compensation current generation circuit.

In one aspect of the method, generating the strain compensation current based on the baes compensation current comprises coupling a plurality of parallel-connected, selectively activated transistor circuits coupled in a current mirror configuration within the variable current source circuit with the baseline compensation circuit generation circuit, and generating, using a control circuit, a plurality of control signals, and coupling the plurality of control signals to the plurality of parallel-connected, selectively activated transistor circuits, respectively, thereby causing one or more of the parallel-connected, selectively activated transistor circuits to conduct to form the strain compensation current.

In one aspect of the disclosure, the method further comprises coupling a temperature compensation circuit having an input terminal to the strain compensation circuit output terminal, and sensing a temperature at the voltage reference circuit. Further, the method also comprises generating a temperature compensation voltage based on the sensed temperature using the temperature compensation circuit, and combining the temperature compensation voltage with the compensated reference voltage at the output terminal of the strain compensation circuit to form a combined strain and temperature compensated reference voltage at an output terminal of the temperature compensation circuit.

In another aspect of the disclosure circuitry for providing a stable voltage reference may be constituted by a plurality of instructions that are stored on a non-transitory computer readable medium. Such circuitry may comprise, for example, one or more circuit cells in an application-specific integrated circuit library (ASIC), and be incorporated into various circuit designs. The instructions, when executed by a processor, are employed to generate circuitry that is configured to generate a reference voltage using a voltage reference circuit, where the generated reference voltage is provided at an output terminal of the voltage reference circuit, and the reference voltage comprises a first transfer function of voltage with respect to strain. The circuitry is further configured to generate a strain compensation voltage using a strain compensation circuit that has an input terminal connected to the output terminal of the voltage reference circuit, wherein the strain compensation voltage comprises a second transfer function of voltage with respect to strain that is substantially opposite that of the first transfer function. The circuitry is still further configured to combine the reference voltage with the strain compensation voltage to form a compensated reference voltage, and output the compensating reference voltage at an output terminal of the strain compensation circuit.

In another aspect of the disclosure, the circuitry generated in response to the executed instructions is configured to source or sink a strain compensation current to or from, respectively, the strain compensation circuit using a variable current source circuit. The strain compensation current results in the strain compensation voltage. The circuitry is further configured to generate a baseline compensation current using a baseline compensation current generation circuit configured; and generate the strain compensation current based on the baseline compensation current by coupling the variable current source circuit to the baseline compensation current generation circuit. In one aspect of the disclosure generating the strain compensation current based on the baseline compensation current comprises coupling a plurality of parallel-connected, selectively activated transistor circuits coupled in a current mirror configuration within the variable current source circuit with the baseline compensation circuit generation circuit, and generating, using a control circuit, a plurality of control signals, and coupling the plurality of control signals to the plurality of parallel-connected, selectively activated transistor circuits, respectively, thereby causing one or more of the parallel-connected, selectively activated transistor circuits to conduct to form the strain compensation current.

In another aspect of the disclosure the circuitry is configured to couple a temperature compensation circuit having an input terminal to the strain compensation circuit output terminal, and sense a temperature at the voltage reference circuit. The circuitry is also configured to generate a temperature compensation voltage based on the sensed temperature using the temperature compensation circuit, and combine the temperature compensation voltage with the compensated reference voltage at the output terminal of the strain compensation circuit to form a combined strain and temperature compensated reference voltage at an output terminal of the temperature compensation circuit.

BRIEF DESCRIPTION OF THE DRAWINGS

The same reference numbers or other reference designators are used in the drawings to designate the same or similar (functionally and/or structurally) features.

DETAILED DESCRIPTION

The following description provides many different examples for implementing different features of the provided subject matter. Specific examples of components and arrangements are described below to simplify the present description. The drawings are not drawn to scale.

Figure 1:
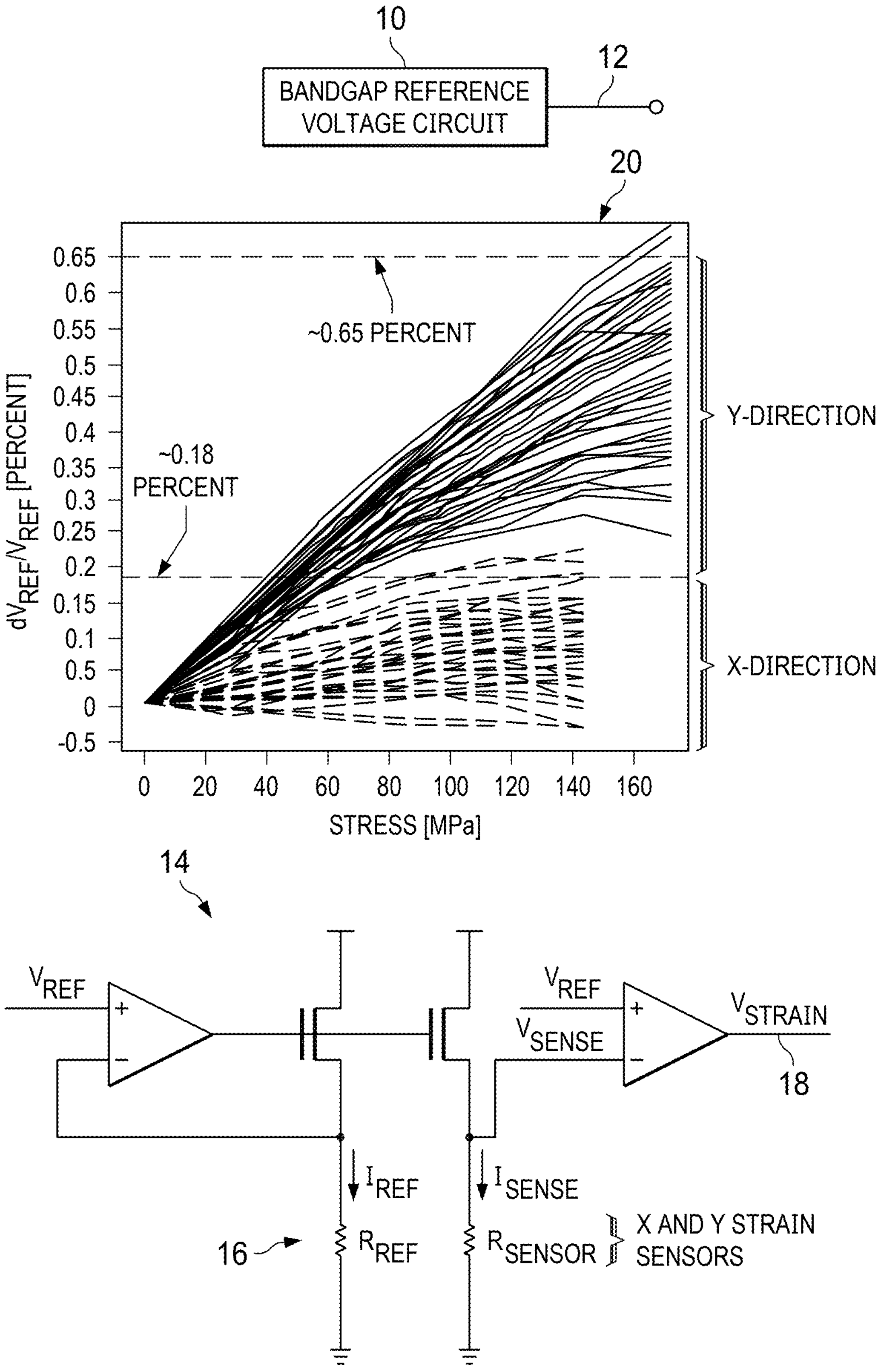
FIG. 1 (PRIOR ART)
FIG. 1 is a combined circuit diagram and graph of a known voltage reference circuit, strain gauge sensor circuit, and graph showing a percentage change in a reference voltage over strain in orthogonal directions.

FIG. 1 is a combined circuit diagram and graph illustrating a strain compensation scheme for a voltage reference circuit that is known to the inventors of the present disclosure. Reference voltage circuits are common circuit applications, and providing a stable, precision output voltage reference is the objective of such circuit applications. One challenge in providing a stable, precise output voltage is voltage drift, and such drift can occur due to various factors, including strain (also called stress) and temperature. Drift due to strain occurs based on various factors such as long-term drift (LTD), which is a time-varying stress, and can be significant for circuit dies within plastic packages, solder shift in the die attach, and thermal hysteresis in both back-end-of-line (BEOL), and front-end-of-line (FEOL) processing.

One conventional way of reducing voltage reference drift is to take steps to minimize the amount of stress/strain experienced by the circuitry. For example, use of a low stress gradient floor plan (i.e., circuitry layout on the die), use of a polyamide layer, low stress packaging, and a low stress die attach process.

Another conventional approach to improving the precision of an output reference voltage is to compensate for any strain/stress that is experienced by the voltage reference circuitry. For example, a stress sensor circuit may be located local to the voltage reference circuitry, and then compensation is employed to the reference voltage circuitry output to compensate for voltage drift caused by the detected stress.

Figure 2:
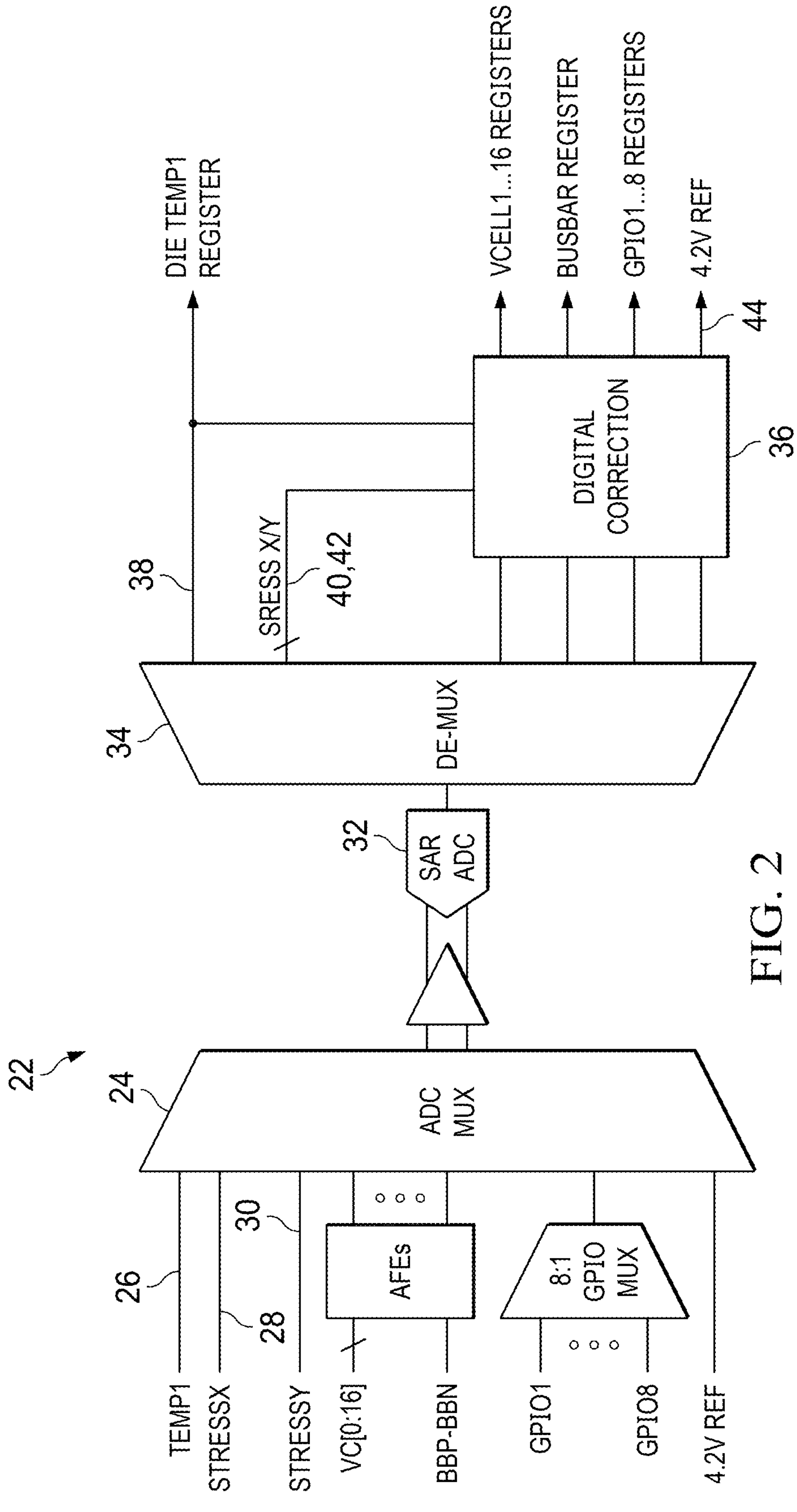
FIG. 2 (PRIOR ART)
FIG. 2 is a block diagram of an SAR ADC temperature and strain compensation circuit employing the detected strain from the strain gauge sensor circuit of FIG. 1.

One compensation solution known to the inventors of the present disclosure is illustrated in FIGS. 1 and 2. At reference numeral 10, a bandgap reference voltage circuit is provided and generates a reference voltage at an output terminal 12. Local to the bandgap reference voltage circuit 10, a strain gauge circuit 14 is provided to sense a die stress experienced by the bandgap reference voltage circuit 10 in one direction (e.g., the X-direction). In one example, a sensor element 16 (e.g., a resistor) that exhibits a characteristic that varies in a predictable fashion with the X-direction strain generates an output voltage that is indicative of the detected strain at an output terminal 18 of the strain gauge circuitry 14. Similarly, a second strain gauge circuit detects strain in a second, orthogonal direction (e.g., a Y-direction) and outputs a voltage indicative thereof.

The graph 20 in FIG. 1 shows data illustrating a percentage drift in a voltage reference output for multiple voltage reference circuits on different dies for various amounts of strain. It is this variation in the output reference voltage that is to be compensated.

FIG. 2 is a block diagram illustrating an analog-to-digital converter (ADC) that operates to provide strain and temperature compensation in the digital domain. An input multiplexer 24 receives multiple analog inputs, including, inter alia, a sensed temperature input value 26, and two strain input values 28, 30 that reflect the detected strain at the die in two orthogonal directions. The analog inputs 26, 28 and 30 are passed via the multiplexer 24 in a serial fashion, converted into digital values via the ADC 32, de-multiplexed by a de-multiplexer 34, and processed by a digital correction circuit block 36. More specifically, the digital correction circuit block 36 receives digitized values for the detected digital temperature 38 and detected digital strain vectors 40, 42, and provides compensation to the reference voltage to generate a digitally compensated reference voltage value 44.

The solution of FIG. 2 incorporates multiple stages of circuitry to implement, wherein each cascaded stage is a potential source of error. Further, the digitization of the analog values into the digital domain results in quantization errors. Lastly, the digital correction block 36 includes clock noise that further contributes to compensation errors. Consequently, such a digital solution is not an optimal option for a high precision voltage reference application.

Another solution known to the inventors employs two different types of strain gauges to generate a differential signal and then utilizes temperature compensation on the residual temperature response. Such a solution needs first and second order temperature compensation, and much of the detected strain information can be lost due to multiple sources of error.

Another solution known to the inventors utilizes a Wheatstone bridge type architecture, where a principle that a ratio of resistors exhibits a zero potential difference when no strain exists is implemented. Thus, a detected potential difference is indicative of a detected strain. This solution needs the material of the resistors in the bridge circuitry to be the same with respect to temperature drift, otherwise temperature error may alias into the stress signal. Further, care is required to ensure that only one resistor in the bridge arrangement is strain sensitive, or that the resistors are arranged so that one resistor experiences compressive stress while another experiences tensile stress to create a differential signal. These requirements may also be sources of error. In addition, subsequent active processing and driver circuitry is needed for compensation, which adds still further error.

The present disclosure is directed to a circuit and method of providing a precision voltage reference. The solution employs a combined strain detection and strain compensation mechanism within the circuitry that exhibits a transfer function (e.g., voltage drift with respect to strain) that is substantially the inverse to the transfer function of the voltage reference circuitry. The two transfer functions essentially cancel one another, thereby resulting in a compensated reference voltage that is substantially independent of strain. According to one aspect of the disclosure, the strain detection circuitry is also the compensation circuitry, and the compensation is performed in the analog domain, thereby reducing a number of circuitry stages and errors associated therewith.

Figure 3:
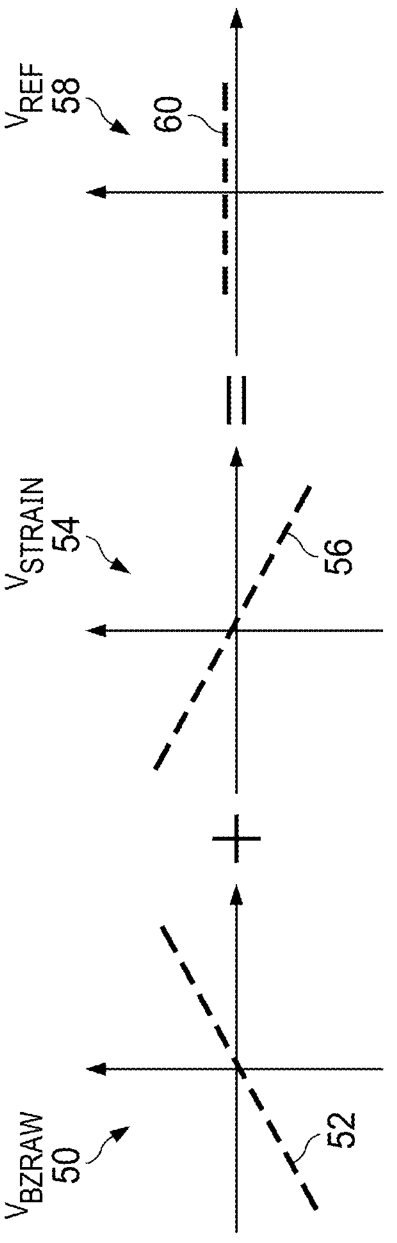
FIG. 3 shows three graphs containing transfer functions, wherein the first graph shows a voltage reference circuit transfer function, the second graph shows a strain compensation circuit transfer function, and the third graph shows an analog combination of the two transfer functions.
Figure 4:
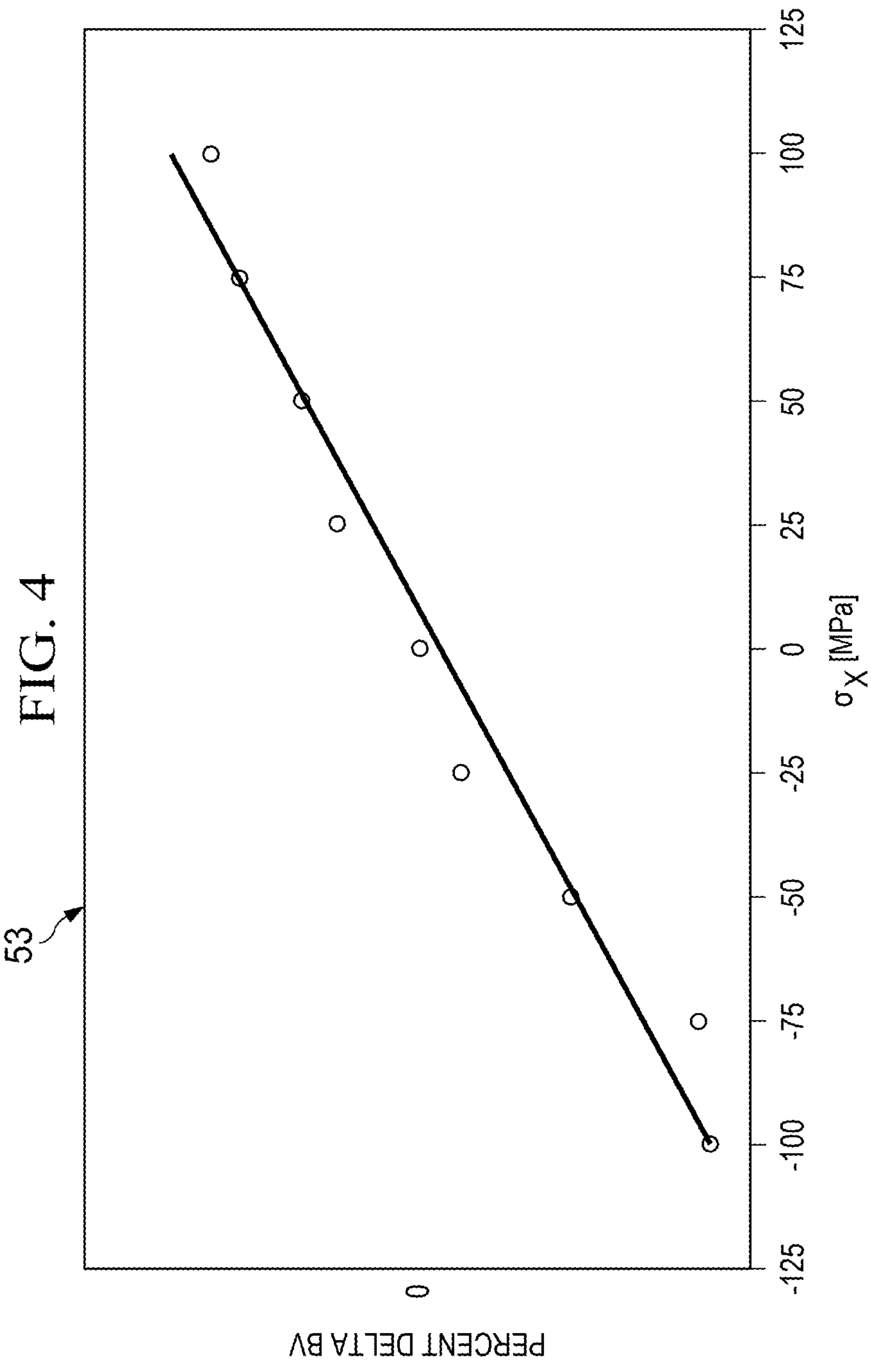
FIG. 4 is a graph illustrating empirical data of a voltage reference circuit showing a voltage drift over variations in strain.

FIG. 3 shows three graphs that illustrate transfer functions and the conceptual solution according to the present disclosure, wherein a voltage reference circuit is provided having an output voltage that is substantially independent of variation due to strain. In a first graph 50, a transfer function 52 is shown that reflects a transfer function of a typical voltage reference circuit. In graph 50 thereof, a voltage 52 exhibited at an output terminal of a voltage reference circuit varies in a generally positive, linear fashion with respect to stress. FIG. 4 shows empirical data 53 collected from a typical voltage reference circuit. As seen from the data 53, for negative stress values and positive stress values (e.g., which can reflect compressive and tensile type stresses), the value of the output voltage does not stay constant, as would be desired, but instead "drifts" in a substantially positive, linear fashion.

Still referring to FIG. 3, the second graph 54 shows another transfer function 56 that generally opposite that of the transfer function 52 of the voltage reference circuit in graph 50. This second graph 54 illustrates how, according to the present disclosure, a variation in strain results in a change in a voltage characteristic of a strain gauge element or circuit. In one example, this can be reflected by a piezoelectric resistor element or other type of circuitry. More particularly, with a piezoelectric resistor, such as, in one non-limiting example, an N-well type diffusion resistor, a voltage drop across the resistor element varies generally linearly with respect to strain. As the voltage drops across the resistor, such an element, when placed in series with the output terminal of the voltage reference circuit, results in a subtraction (i.e., a voltage drop across the strain gauge element), thus reflected as the opposite transfer function 56 in graph 54. As the magnitude of the voltage drop across the strain gauge is also a function of the current through the strain gauge element, the opposite transfer function 56 can be "tuned" or "trimmed" to closely match the positive drift of the output voltage of the voltage reference circuit. Then, by combining the two transfer functions together, a third graph 58 is generated, wherein a transfer function thereof 60, a combination of the transfer functions 52 and 56, results in a compensated output voltage reference that is substantially independent of strain. That is, the reference voltage at the compensated output terminal of the circuit does not experience "drift" due to strain experienced at the circuit. Further, according to the present disclosure, use of a strain gauge, not simply to detect a strain, but as the strain compensation element itself, simplifies the circuitry, reduces the many sources of error in known, conventional solutions, and provides a reference voltage accuracy, where "drift" due to strain is greatly reduced.

Figure 5:
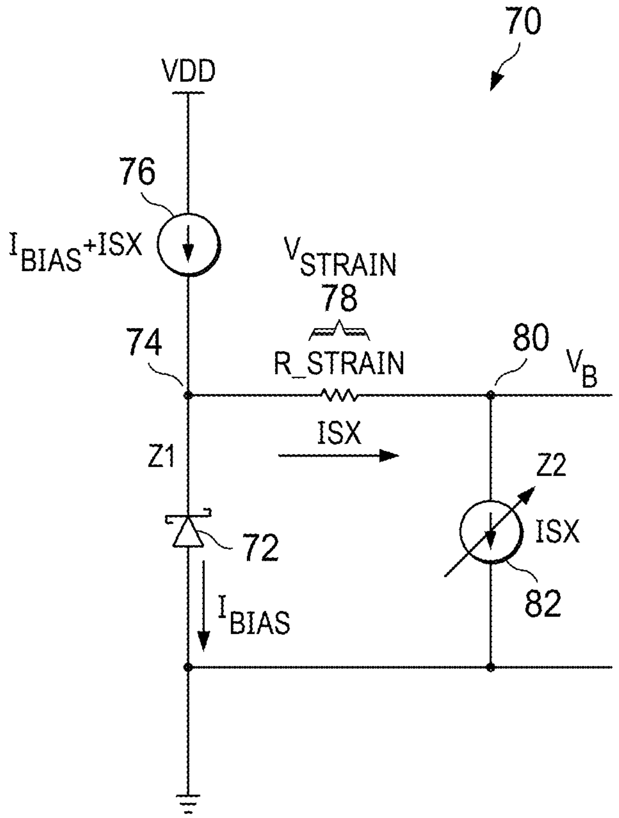
FIG. 5 is a circuit schematic diagram illustrating a circuit exhibiting a stable voltage reference that is substantially independent of strain, in an example.

FIG. 5 is a schematic circuit diagram illustrating a circuit 70 that provides a voltage reference that is substantially independent of strain. The circuit 70 includes a voltage reference circuit 72 that generates a reference voltage at an output terminal 74. A current source circuit 76 is coupled between a predetermined voltage, such as a supply voltage Vdd, for example, and the output terminal 74. A strain compensation circuit 78 is coupled between the output terminal 74 of the voltage reference circuit 72 and a compensated reference voltage output terminal 80. A variable or programmable current source circuit 82 is also connected to the compensated reference voltage output terminal 80, for example, in parallel with the series combination of the voltage reference circuit 72 and the strain compensation circuit 78.

In one aspect of the disclosure, the voltage reference circuit 72 comprises a zener diode that exhibits a zener breakdown voltage equal to the desired reference output voltage at the output terminal 74 when it is reverse biased. Alternatively, the reference voltage circuit 72 may comprise other type voltage reference circuits, such as a bandgap reference voltage circuit or other type reference voltage circuit, and any such alternatives are contemplated as falling within the scope of the disclosure.

In operation, the circuit 70 operates as follows. Under reverse bias breakdown conditions, the voltage reference circuit 72, operating in one example, as a zener diode, conducts a zener breakdown current therethrough, which is illustrated as $I_{BIAS}$. The current source circuit 76 provides a current to the output terminal 74 with a current magnitude of $I_{BIAS}$+ISX, wherein ISX is a compensation current and may be positive or negative. As the zener diode is conducting $I_{BIAS}$, the compensation current ISX passes through the strain compensation circuit 78 and is sinked or sourced by the variable current source circuit 82.

The compensation current ISX conducts through the strain compensation circuit 78 and causes a voltage drop thereacross. For example, in one aspect of the disclosure the strain compensation circuit 78 is a circuit having an impedance that is a function of strain, such as a piezoelectric resistor $R_{SG}$. In this manner, if the compensation current ISX were fixed, a voltage drop across the strain compensation circuit 78 will vary in response to variations in strain experienced by the circuit 70. Optionally, as strain experienced by the circuit 70 causes a "drift" of the reference voltage at the reference voltage output terminal 74 in a generally positive, linear fashion over variations in strain, like graph 50 showing transfer function 52 in FIG. 3, the voltage drop across the strain compensation circuit 78 changes similarly due to the change in its impedance due to the strain experienced by the circuit 70, as illustrated in graph 54 with transfer function 56 of FIG. 3. The resultant compensated reference voltage at the compensated reference voltage output terminal 80 is an analog summation of the transfer functions of the reference voltage circuit 72 and the strain compensation circuit 78.

Figure 6:
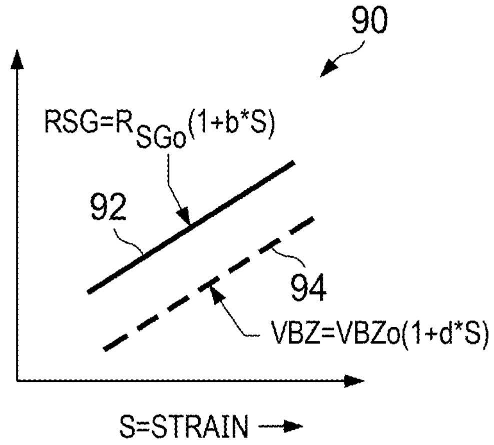
FIG. 6 is a graph illustrating different strain sensitivities for a voltage reference circuit and a strain compensation circuit.

Referring to FIG. 6, a graph 90 is provided showing the "stress sensitivity" of both the voltage reference circuit 72 (e.g., the zener diode) and the strain compensation circuit 78 (e.g., the piezoelectric resistor). In both instances the circuits exhibit a similar, but non-identical relationship of a circuit characteristic with respect to strain. Via empirical data collected on a number of circuit structures, the stress sensitivity "b" 92 of the strain gauge element (e.g., the impedance) was found to be about 4.4%/100 MPa, and the stress sensitivity "d" 94 of the zener element (e.g., the zener breakdown voltage) was found to be about 0.02%/100 MPa. Therefore, while the strain response of both elements is similar, a tuning of the response of the strain compensation circuit 78 may be employed by varying the sink/source current ISX through the strain gauge element to more closely match the transfer functions of the two circuits. This tuning may be effectuated using the variable current source circuit 82.

Figure 7:
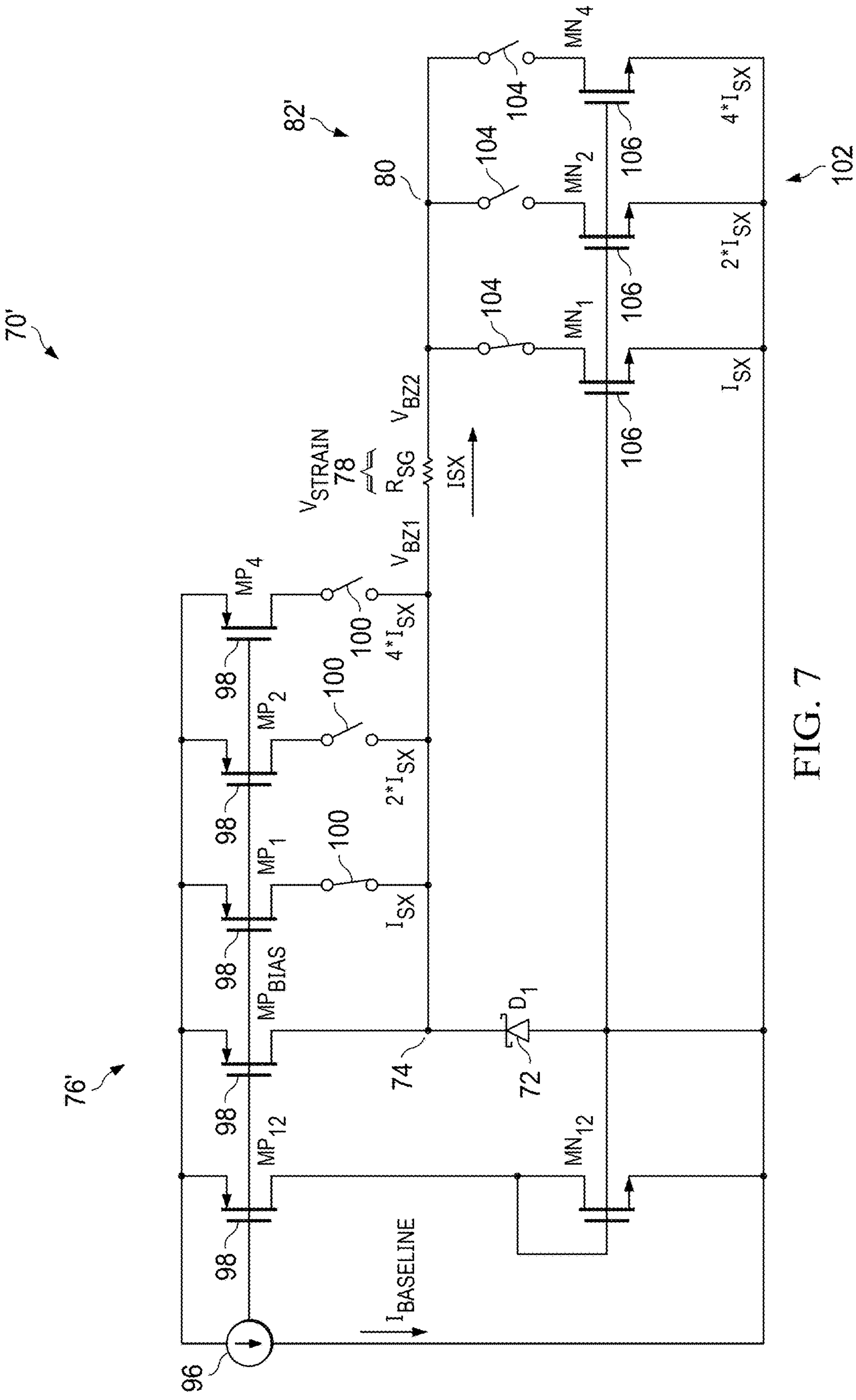
FIG. 7 is a circuit schematic diagram illustrating a circuit that exhibits a stable voltage reference showing in greater detail an ability to tune the strain compensation circuit for improved performance, in an example.

FIG. 7 is a schematic diagram illustrating in one embodiment of the disclosure, a circuit 70' which is similar to circuit 70 of FIG. 5, showing greater detail of a current source circuit 76' (analogous to the current source circuit 76 of FIG. 5) and a variable current source circuit 82' (analogous to the variable current source circuit 82 of FIG. 5). Similar to FIG. 5, FIG. 7 includes the reference voltage circuit 72 represented by a zener diode, and a strain compensation circuit 78 represented by a piezoelectric resistor $R_{SG}$.

A tuning of the circuit 70' is via the current source circuit 76' and the variable current source circuit 82'. The current source circuit 76' comprises a baseline compensation current source circuit 96 that generates a baseline compensation current $I_{BASELINE}$ (e.g., some fractional value of ISX). This current is mirrored to a plurality of parallel-configured transistors 98 (e.g., in a current mirror circuit topology) that may be selectively connected to the voltage reference output terminal 74 via switches 100. In one embodiment the current mirror transistors 98 are sized differently from one another in order to conduct different magnitudes of current, if their associated switch 100 is closed. Alternatively, each of the transistors 98 may be sized roughly equally, or different ones can be sized the same while others are sized different from one another.

Still referring to FIG. 7, the variable current source circuit 82' includes transistor circuitry 102. The transistor circuitry includes a plurality of parallel-connected, selectively activated transistors 106, and at least one of those transistors 106 are series-connected via a switch 104 to the compensated reference voltage output terminal 80. The transistors 106 each forms a current mirror configuration in which a transistor 106 conducts a current related to the baseline compensation current ($I_{BASELINE}$) generated by baseline compensation circuit 96. In the above fashion, the current ISX that conducts through the strain compensation circuit 78 can be scaled by the number of switches 104 that are closed in the variable current source circuit 82'.

As can be seen in FIG. 6, while the stress/strain sensitivities 92 and 94 of the strain compensation circuit 78 and the voltage reference circuit 72 are similar, they are not identical. Thus, without any tuning of the circuitry, an analog combination of the two transfer functions of such circuits will not result in an optimal cancellation, as illustrated in FIG. 3. Rather, the analog combination of the transfer functions would still result in a net drift of the compensated reference voltage due to strain. By tuning the circuitry 70' as illustrated in FIG. 7, the current ISX that sinks/sources through the strain compensation circuit 78 can be increased or decreased to account for the variations in the strain sensitivities "b" and "d", for example. In the above manner the second, opposite transfer function is tuned or "shifted" by the change in ISX in order to make the transfer function match (e.g., be inverse with respect to one another), thereby resulting in a compensated reference voltage that is substantially independent of strain.

In one aspect of the disclosure, a tuning process can be done after fabrication and packaging of the circuitry 70, and before being sent out to customers. By characterizing a plurality of different devices in a device test setting where varying amounts of stress/strain are applied to the finished package, the strain sensitivities of the strain compensation circuit and the voltage reference circuit can be ascertained. With a determination of the variation between the sensitivities established, it can be determined how much tuning is required to make the transfer function of the strain compensation circuit 78 substantially the opposite of the transfer function of the voltage reference circuit 72. The tuning is then achieved by establishing which one or more of the switches 100 and 104 are to be closed and which are to be open, and programming a control circuit to provide the requisite control signals to open/close the appropriate switches. Further, such device characterization can be done for each production lot of the circuitry, or for each packaging lot, or according to other criteria, and all such alternatives are contemplated as falling within the scope of the present disclosure.

Figure 8A:
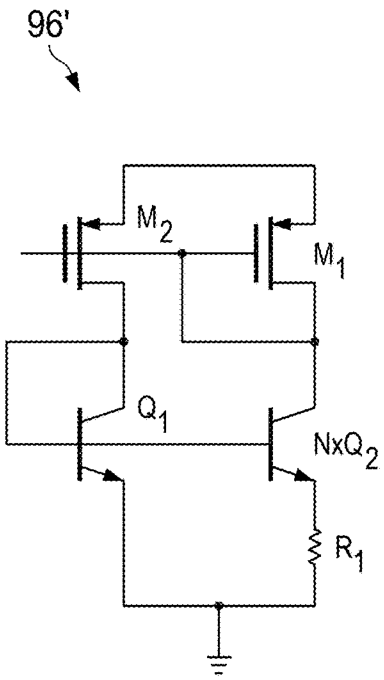
FIGS. 8A and 8B are circuit schematic diagrams, in an example, illustrating alternative baseline compensation current source circuits that may be employed in the circuits of FIGS. 5 and 7.
Figure 8B:
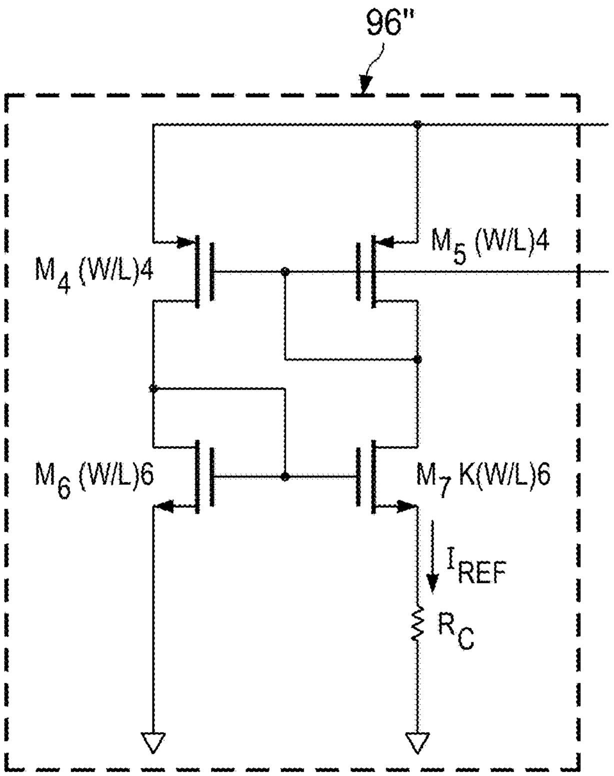

FIGS. 8A and 8B are circuit schematic diagrams illustrating examples of baseline compensation circuit source circuits 96' and 96" that may be employed in the circuit 70' of FIG. 7. In FIG. 8A, the baseline compensation current source circuit 96' is implemented by a $\Delta V_{BE}/R$ type circuit. Such circuitry provides an advantage that it has a fixed bias, exhibits strain cancellation with the $\Delta V_{BE}$, and there is no process dependence on Q1. FIG. 8B shows a baseline compensation current source circuit 96" implemented by a constant transconductance $\Delta V_{GS}$ current bias generator. It also provides an advantage that it has a fixed bias, exhibits strain cancellation with the $\Delta V_{GS}$, and there is no process dependence on bottom MOS transistors. These circuits in FIGS. 8A and 8B are examples, and any current source circuitry may be employed and is contemplated as falling within the scope of the present disclosure.

Figure 9:
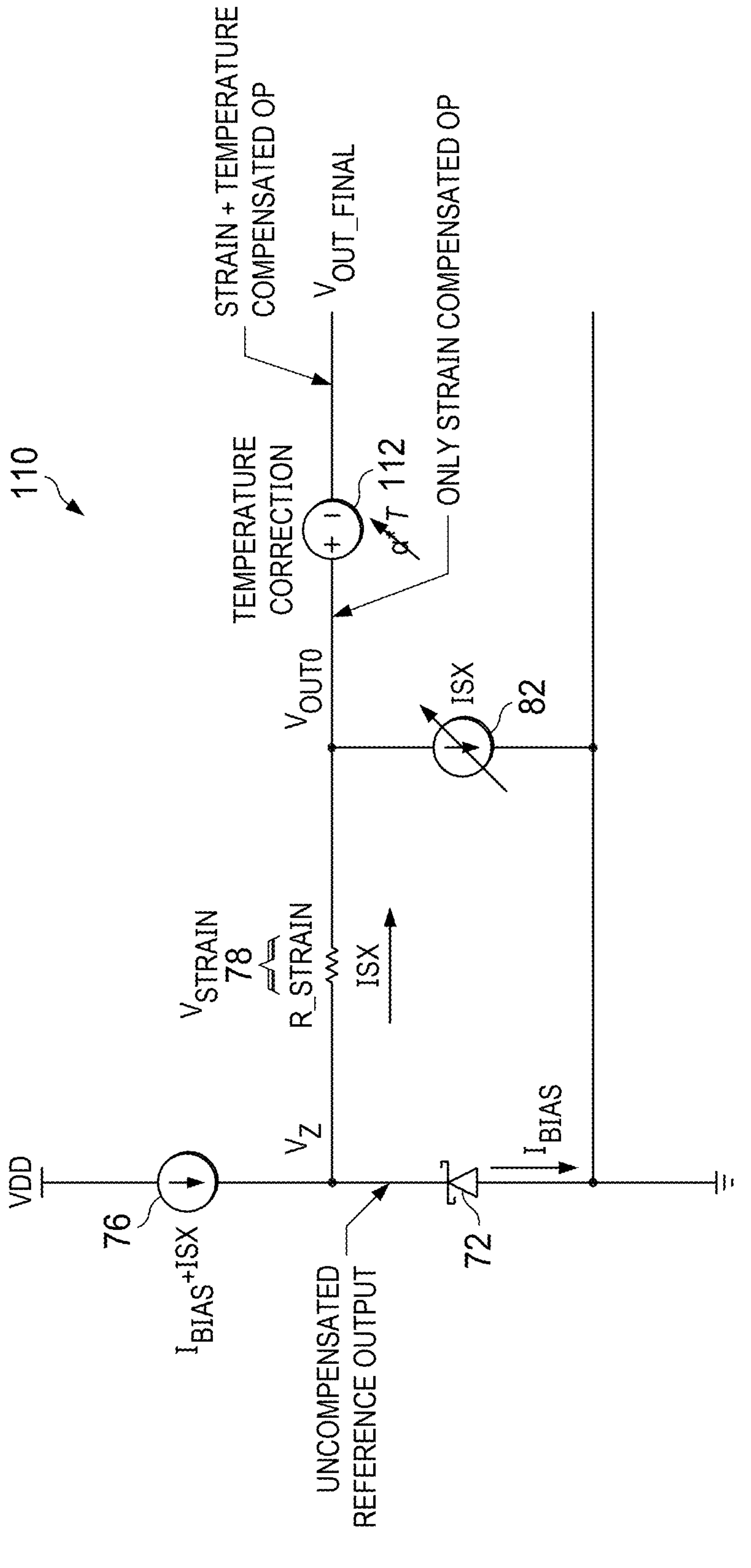
FIG. 9 is a circuit schematic diagram illustrating a circuit that exhibits a stable voltage reference that is substantially independent of strain and temperature, in an example.

FIG. 9 is a schematic circuit diagram illustrating a voltage reference circuit 110 that employs both strain and temperature compensation. The circuit 110 is in many respects similar to the circuitry 70 of FIG. 5, with the exception that the circuit 110 further includes a temperature compensation circuit 112 that is downstream of the strain compensation circuit 78. More particularly, the temperature compensation circuit 112 contains at least temperature compensation circuitry that is connected to the strain compensated voltage reference output terminal 80. This means that the circuit 110 first performs strain compensation via the strain compensation circuit 78 independent of consideration of temperature fluctuations at the circuitry. After performing strain compensation and providing a strain compensated reference output voltage at output terminal 80, further compensation is performed on this voltage based on the temperature detected at the circuit 110. By placing temperature compensation downstream of the strain detection/compensation, multi-stage circuitry errors are avoided, including but not limited to temperature aliasing errors.

Figure 10:
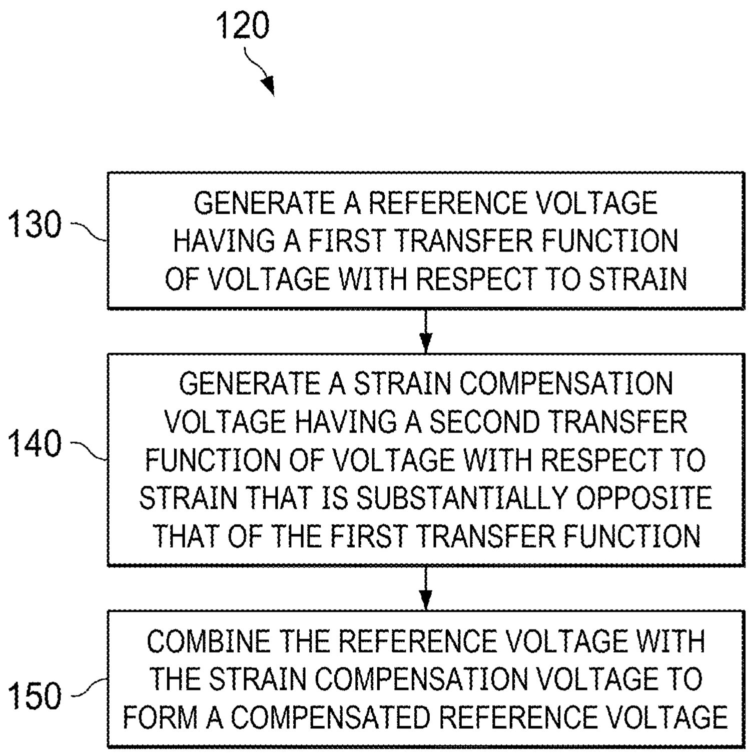
FIG. 10 is a flowchart diagram illustrating a method of providing a stable voltage reference, in an example.

FIG. 10 shows a flowchart illustrating a method 120 according to the present disclosure. The method can be performed in conjunction with any circuitry, and a few examples are provided above in FIGS. 5 and 7. The method 120 comprises generating at 130 a reference voltage using a voltage reference circuit, wherein the generated reference voltage is provided at an output terminal of the voltage reference circuit. The reference voltage comprises a first transfer function of voltage with respect to strain. The method 120 further comprises at 140 generating a strain compensation voltage using a strain compensation circuit that has an input terminal connected to the output terminal of the voltage reference circuit. The strain compensation voltage comprises a second transfer function of voltage with respect to strain that is substantially opposite that of the first transfer function. Lastly, the method 120 comprises at 150 combining the reference voltage with the strain compensation voltage to form a compensated reference voltage, and outputting the compensating reference voltage at an output terminal of the strain compensation circuit. In one aspect of the disclosure, the strain compensation circuit comprises a strain dependent circuit element that exhibits an impedance that is a function of strain.

In one aspect of the disclosure, the method further comprises sourcing or sinking a strain compensation current to or from, respectively, the strain compensation circuit using a variable current source circuit, wherein the strain compensation current results in the strain compensation voltage. The method may also comprise generating a baseline compensation current using a baseline compensation current generation circuit configured, and generating the strain compensation current based on the baseline compensation current by coupling the variable current source circuit to the baseline compensation current generation circuit. In one aspect generating the strain compensation current based on the baes compensation current comprises coupling a plurality of parallel-connected, selectively activated transistor circuits coupled in a current mirror configuration within the variable current source circuit with the baseline compensation circuit generation circuit, and generating, using a control circuit, a plurality of control signals, and coupling the plurality of control signals to the plurality of parallel-connected, selectively activated transistor circuits, respectively, thereby causing one or more of the parallel-connected, selectively activated transistor circuits to conduct to form the strain compensation current.

In one aspect of the disclosure, the method further comprises coupling a temperature compensation circuit having an input terminal to the strain compensation circuit output terminal, sensing a temperature at the voltage reference circuit, generating a temperature compensation voltage based on the sensed temperature using the temperature compensation circuit, and combining the temperature compensation voltage with the compensated reference voltage at the output terminal of the strain compensation circuit to form a combined strain and temperature compensated reference voltage at an output terminal of the temperature compensation circuit.

In another aspect of the disclosure, circuitry for providing a stable voltage reference may be constituted by a plurality of instructions that are stored on a non-transitory computer readable medium. Such circuitry may comprise, for example, one or more circuit cells in an application-specific integrated circuit library (ASIC), and be incorporated into various circuit designs. The instructions, when executed by a processor, are employed to generate circuitry that is configured to generate a reference voltage using a voltage reference circuit, where the generated reference voltage is provided at an output terminal of the voltage reference circuit, and the reference voltage comprises a first transfer function of voltage with respect to strain. The circuitry is further configured to generate a strain compensation voltage using a strain compensation circuit that has an input terminal connected to the output terminal of the voltage reference circuit, wherein the strain compensation voltage comprises a second transfer function of voltage with respect to strain that is substantially opposite that of the first transfer function. The circuitry is still further configured to combine the reference voltage with the strain compensation voltage to form a compensated reference voltage, and output the compensating reference voltage at an output terminal of the strain compensation circuit.

In another aspect of the disclosure, the circuitry generated in response to the executed instructions is configured to source or sink a strain compensation current to or from, respectively, the strain compensation circuit using a variable current source circuit. The strain compensation current results in the strain compensation voltage. The circuitry is further configured to generate a baseline compensation current using a baseline compensation current generation circuit configured; and generate the strain compensation current based on the baseline compensation current by coupling the variable current source circuit to the baseline compensation current generation circuit. In one aspect of the disclosure generating the strain compensation current based on the baseline compensation current comprises coupling a plurality of parallel-connected, selectively activated transistor circuits coupled in a current mirror configuration within the variable current source circuit with the baseline compensation circuit generation circuit, and generating, using a control circuit, a plurality of control signals, and coupling the plurality of control signals to the plurality of parallel-connected, selectively activated transistor circuits, respectively, thereby causing one or more of the parallel-connected, selectively activated transistor circuits to conduct to form the strain compensation current.

In another aspect of the disclosure the circuitry is configured to couple a temperature compensation circuit having an input terminal to the strain compensation circuit output terminal, and sense a temperature at the voltage reference circuit. The circuitry is also configured to generate a temperature compensation voltage based on the sensed temperature using the temperature compensation circuit, and combine the temperature compensation voltage with the compensated reference voltage at the output terminal of the strain compensation circuit to form a combined strain and temperature compensated reference voltage at an output terminal of the temperature compensation circuit.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

Modifications are possible in the described examples, and other implementations are possible, within the scope of the claims.

What is claimed is:

1. A circuit, comprising:

a voltage reference circuit having an output, in which a voltage at the output of the voltage reference circuit varies with stress in a first direction; and a circuit coupled between the output of the voltage reference circuit and a reference output, in which an impedance of the circuit varies with stress in a second direction opposite from the first direction.

2. The circuit of claim 1, wherein the circuit comprises a piezoelectric resistor.

3. The circuit of claim 1, further comprising:

a variable current source circuit coupled to the reference output.

4. The circuit of claim 3, further comprising:

a current generation circuit configurable to generate a first current; and wherein the variable current source circuit is coupled to the current generation circuit, and further configured to receive the first current and source or sink a second current at the reference output and through the circuit responsive to the first current.

5. The circuit of claim 4, wherein the variable current source circuit comprises:

a plurality of parallel-connected, selectively activated transistor circuits coupled in a current mirror configuration with the current generation circuit; and a control circuit configurable to generate and couple a plurality of control signals to the parallel-connected, selectively activated transistor circuits, respectively, thereby causing one or more of the parallel-connected, selectively activated transistor circuits to conduct to source or sink the second current.

6. The circuit of claim 5, wherein each parallel-connected, selectively activated transistor circuit comprises a transistor connected in series with a switch element that is configurable to receive a respective one of the plurality of control signals at a control terminal thereof, wherein when a state of the respective control signal closes the switch element, the respective parallel-connected, selectively activated transistor circuit is activated and conducts a current therethrough having a magnitude corresponding to a sizing of the respective transistor.

7. The circuit of claim 3, further comprising:

a temperature compensation circuit coupled between the circuit and the reference output, the temperature compensation circuit configurable to provide an offset voltage responsive to a temperature.

8. The circuit of claim 1, wherein the voltage reference circuit includes a Zener diode.

9. A circuit comprising:

a voltage reference circuit having an output;

a resistor coupled between the output and a reference output; and a programmable current source coupled to the reference output configurable to inject or sink a current at the reference output via the resistor.

10. The circuit of claim 9, wherein the resistor has an impedance that is a function of strain.

11. The circuit of claim 10, wherein the resistor is a piezoelectric resistor.

12. The circuit of claim 9, wherein the programmable current source is a first current source, and the circuit further comprises a second current source coupled to the first current source.

13. The circuit of claim 12, wherein the first current source comprises:

a plurality of parallel-connected, selectively activated transistor circuits coupled in a current mirror configuration with circuitry in the second current source; and a control circuit configurable to generate and couple a plurality of control signals to the parallel-connected, selectively activated transistor circuits, respectively, thereby causing one or more of the parallel-connected, selectively activated transistor circuits to conduct.

14. The circuit of claim 13, wherein each parallel-connected, selectively activated transistor circuit comprises a transistor connected in series with a switch circuit element that is configured to receive a respective one of the plurality of control signals at a control terminal thereof, wherein when a state of the respective control signal closes the switch circuit element, the respective parallel-connected, selectively activated transistor circuit is activated and conducts a current therethrough having a magnitude corresponding to a sizing of the respective transistor.

15. The circuit of claim 9, further comprising:

a temperature compensation circuit coupled between the circuit and the reference output, the temperature compensation circuit configurable to provide an offset voltage responsive to a temperature.

16. The circuit of claim 9, wherein the voltage reference circuit includes a Zener diode.

17. A method comprising:

generating a first voltage, in which the first voltage varies with stress in a first direction;

generating a second voltage, in which the second voltage varies with stress in a second direction opposite to the first direction; and generating a third voltage responsive to the first and second voltages.

18. The method of claim 17, wherein the second voltage is generated with a resistor.

19. The method of claim 18, further comprising:

sourcing or sinking a current via the resistor to generate the second.

20. The method of claim 18, wherein generating a third voltage responsive to the first and second voltages includes generating the third voltage responsive to a summation of the first and second voltages, or generating the third voltage responsive to a difference between the first and second voltages.

21. The method of claim 17, further comprising adjusting the third voltage responsive to a temperature.

* * * * *